(12) United States Patent
Huang et al.

(10) Patent No.: US 11,752,732 B2
(45) Date of Patent: Sep. 12, 2023

(54) COMPOSITE METALLIC PANEL

(71) Applicant: DDP SPECIALTY ELECTRONIC MATERIALS US, LLC, Wilmington, DE (US)

(72) Inventors: Wenyi Huang, Midland, MI (US); Ernest Herst, Midland, MI (US); Mark Beach, Midland, MI (US)

(73) Assignee: DDP SPECIALTY ELECTRONIC MATERIALS US, LLC, Wilmington, DE (US)

(*) Notice: Subject to any disclaimer, the term of this patent is extended or adjusted under 35 U.S.C. 154(b) by 18 days.

(21) Appl. No.: 17/478,266

(22) Filed: Sep. 17, 2021

(65) Prior Publication Data

US 2022/0111617 A1    Apr. 14, 2022

Related U.S. Application Data

(60) Provisional application No. 63/091,356, filed on Oct. 14, 2020.

(51) Int. Cl.
*B32B 7/12* (2006.01)
*B32B 15/01* (2006.01)

(52) U.S. Cl.
CPC .............. *B32B 7/12* (2013.01); *B32B 15/016* (2013.01); *B32B 2250/02* (2013.01); *B32B 2255/06* (2013.01); *B32B 2255/26* (2013.01); *B32B 2607/00* (2013.01)

(58) Field of Classification Search
None
See application file for complete search history.

(56) References Cited

U.S. PATENT DOCUMENTS

| | | | |
|---|---|---|---|
| 4,530,877 A | 7/1985 | Hadley | |
| 2004/0192874 A1* | 9/2004 | Walker | C08L 83/04 528/32 |

FOREIGN PATENT DOCUMENTS

| | | | |
|---|---|---|---|
| DE | 102015015633 A1 | | 6/2016 |
| EP | 0347049 A2 | * | 5/1989 |
| EP | 0347049 A2 | | 12/1989 |
| JP | 2005254557 A | * | 9/2005 |
| WO | WO2018056298 A1 | * | 3/2018 |

OTHER PUBLICATIONS

PCT International Search Report for Application No. PCT/US2021/050894; Erika Aspeby, Authorized Officer; ISA/EPO; dated Jul. 1, 2022.

* cited by examiner

*Primary Examiner* — Tamra L. Dicus

(57) ABSTRACT

A composite panel comprises first and second metallic sheets each having an inner and outer surface, a silicone-based primer coating on the inner surface of the first and second metallic sheets and an organosilicon adhesive contacting the primer coating on both the first and second metallic sheets, wherein the adhesive has a gross heat of combustion (Q-PCS) of no greater than 1.4 MJ/m². The panel is compliant with specification EN 13501-6:2018, classification A1.

9 Claims, 1 Drawing Sheet

COMPOSITE METALLIC PANEL

BACKGROUND OF THE INVENTION

1. Field of the Invention

This invention pertains to a composite metallic panel useful in building construction.

2. Description of Related Art

Metallic cladding panels have been used in building construction for many years. These panels may be installed both internally and externally. Loss of life and property from fire is becoming of increasing concern and higher standards have been promulgated to address these concerns. One such standard is specification EN 13501-6:2018, classification A1.

A further requirement of cladding panels is that there is no delamination while in service and therefore increasing bond strength between the components of the panel is also a desirable feature.

BRIEF SUMMARY OF THE INVENTION

This invention is directed to a composite panel comprising first and second metallic sheets each having an inner and outer surface, a silicone-based primer coating on the inner surface of the first and second metallic sheets and an organosilicon adhesive contacting the primer coating on both the first and second metallic sheets, wherein the adhesive has a gross heat of combustion (Q-PCS) of no greater than 1.4 MJ/m$^2$. The panel is compliant with specification EN 13501-6:2018, classification A1.

DETAILED DESCRIPTION OF THE INVENTION

Composite Panel

Figure 1:
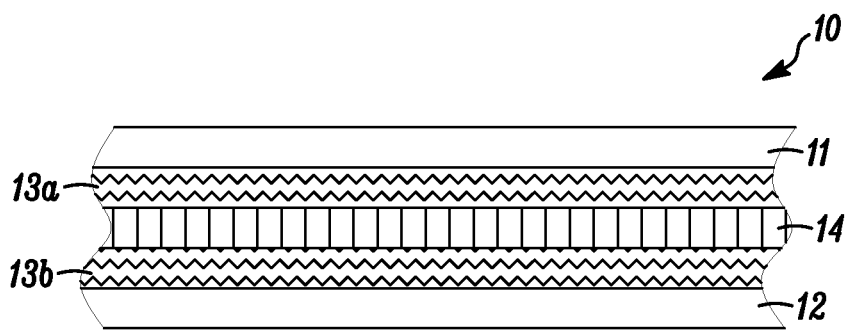
FIG. 1 is a sectional view of one embodiment of a panel of this invention.
Figure 2:
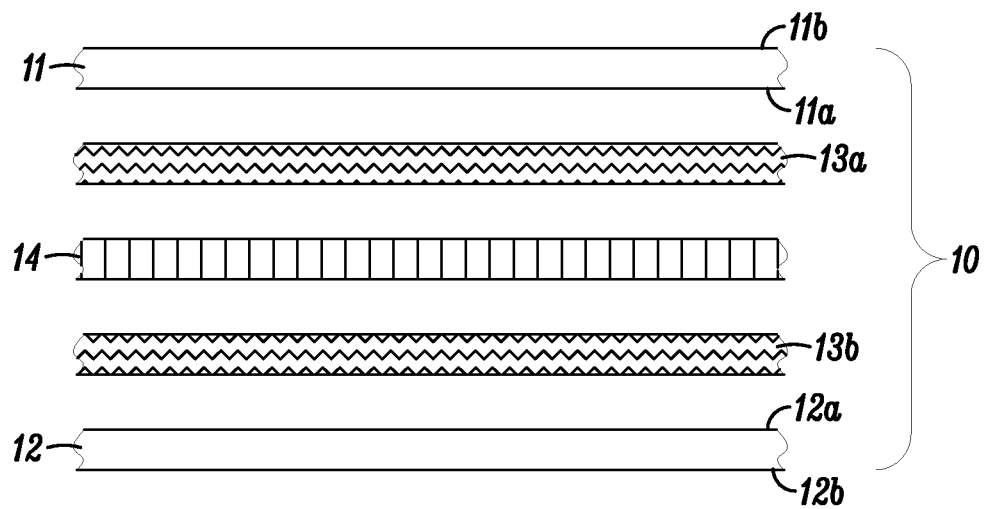
FIG. 2 is an expanded view of FIG. 1.

As shown in FIGS. 1 and 2, a composite panel of this invention comprises first and second metallic sheets 11 and 12 each having an inner surface 11a or 12a and an outer surface 11b or 12b respectively, a silicone-based primer coating 13a and 13b on the inner surface of the first and second metallic sheets and an organosilicon adhesive 14 contacting the primer coating on both the first and second metallic sheets.

The first and second metallic sheets may be the same or different. By different is meant that the two sheets are of different metallic compositions or, if of the same composition, are of different grades, dimensions or some other physical property. A preferred metallic sheet is of aluminum such as grade 3003. A typical sheet thickness is about 1.5 mm.

The panel is compliant with specification EN 13501-6: 2018, classification A1.

Figure 3:
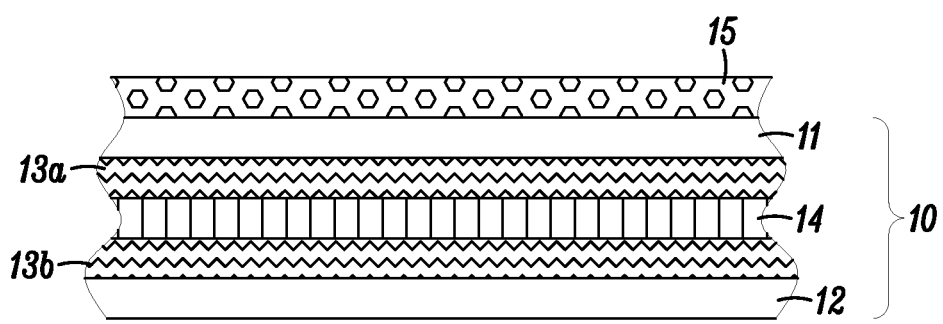
FIG. 3 is a sectional view of a further embodiment of a panel of this invention.

FIG. 3 shows a further optional embodiment of the invention wherein a functional layer 15 is located on an external surface of at least one of the metallic sheets. By functional layer is meant a layer providing additional functionality such as decorative effects, water repellency, anti-fungal properties, UV resistance, anti-corrosion resistance, scratch and wear resistance.

Primer

Suitable primer coatings are based on a silane, a siloxane or a blend of silane and polyurethane. The primer enhances the bond strength between the adhesive and metallic sheets. A desirable peel strength between the adhesive and the sheet is at least 25 pounds per linear inch (pli) as measured by ASTM D1876-08(2015).

Adhesive

The organosilicon adhesive has a gross heat of combustion (Q-PCS) of no greater than 1.4 MJ/m$^2$. In some embodiments, the organosilicon adhesive is polydimethylsiloxane or copolymers thereof. In some other embodiments, the organosilicon adhesive is a blend of polydimethylsiloxane or copolymers thereof with epoxy or urethane or acrylate.

Preferably, the adhesive has a cure temperature of no greater than 150 degrees C., more preferably no greater than 120 degrees C.

Preferably, the thickness of the cured adhesive is no greater than 100 micrometers, more preferably no greater than 70 micrometers and most preferably no greater than 60 micrometers.

A suitable adhesive is DOWSIL™ HM-2400 from Dow, Midland, Mich.

Test Methods

The 180° peel adhesion test was in accordance with ASTM C794-18 and the 90° peel test complied with ASTM D6862-11.

Examples

Fire Testing

It is predicted that a composite aluminum panel as described herein wherein the adhesive has a gross heat of combustion (Q-PCS) of no greater than 1.4 MJ/m$^2$ will be compliant with EN 13501-6:2018, classification A1.

Panel Peel Strength Evaluation.

Both 180° and 90° peel adhesion tests were carried out on representative composite panels as exemplified in FIGS. 1 and 2.

The aluminum sheets were 3003 grade H14 mill finish, 1.5 mm thick from Buymetal.com.

Three primers were evaluated:

Nr. 1—BETASEAL™ 16100A, a one-step primer from DuPont, Wilmington, Del.

Nr. 2—BETASEAL™ 43521/BETASEAL™ 43532, a two-step primer also from DuPont.

Nr. 3—DOWSIL™ 1200 OS, a one-step primer from Dow, Midland, Mich.

The primers were applied to the surface of the aluminum plates and conditioned according to ASTM C784-18. The primer coating was present in an amount of about 0.1-1 micrometers for Primer 1 (BETASEAL™ 16100A), 76-127 micrometers for Primer 2 (BETASEAL™ 43521/BETASEAL™ 43532), and 0.1-1 micrometers for Primer 3 (DOWSIL™ 1200 OS).

As a control, there was also an example without primer.

In all examples, the silicone adhesive was DOWSIL™ HM-2400 applied so that the thickness of cured adhesive was about 4 mm.

The adhesion test samples were prepared as follows. DOWSIL™ 2400 silicone assembly sealant was preheated by a hot melt gun at 120° C. for 45 minutes. The adhesion-in-peel panel samples were prepared according to test method ASTM C794-18. Masking tape was applied to the aluminum plate surface adjacent to the test area to allow easy removal of excess silicone adhesive sealant. Then, a bead of silicone adhesive at least 150 mm (6 inches) in length was dispensed on the aluminum plate surface. While keeping it warm by using a heat gun, a wire mesh screen was immediately placed onto the bead and lightly tapped into the silicone adhesive sealant. Next, the screen was held with a finger to prevent slippage and it was gently drawn down the silicone adhesive sealant to embed the wire mesh into the wet sealant. This was competed with the assistance of a tooling device which was held at a 90° angle to the substrate from one side. The wire mesh screen was then embedded to a uniform depth of 2 mm from the substrate surface. A second bead of silicone adhesive sealant was immediately applied over the first bead of sealant and wire mesh screen. Again, the screen was held down with a finger to prevent slippage, and a tooling device was used to draw down the sealant at a 90° angle to the substrate from the other side. The total depth of the sealant was about 4 mm and the wire mesh screen embedded uniformly at the approximate midpoint of the total sealant depth. The screen was a steel screen and screen surface cleaned with xylene.

Excess silicone adhesive sealant beyond the edge of the wire mesh screen was removed while the sealant was wet using a putty knife or spatula. Finally, the masking tapes were removed, and the silicone adhesive sealant allowed to cure for one week at 22° C. (72° F.) and at 50% RH.

180° Peel Test:

The screen test coupon was pulled at a rate of 50 mm/min for a total of 1 minute. The peak load and average load were recorded and the failure mode, either adhesive or cohesive failure noted. Results are shown in Table 1.

TABLE 1

| Direction or Information | Primer #1 Example 1 | Primer #2 Example 2 | Primer #3 Example 3 | No Primer Comparative Example A |
|---|---|---|---|---|
| Peak Load (lbf | 69.70 | 50.21 | 64.12 | 46.75 |
| Std. Dev. | 12.36 | 5.98 | 3.48 | 2.23 |
| Avg. Load (lbf) | 49.95 | 41.14 | 47.66 | 40.38 |
| Std. Dev. | 7.65 | 4.38 | 3.50 | 1.79 |
| Number of Adhesive Failures | 0 | 3 | 0 | 5 |
| Number of Cohesive Failures | 6 | 0 | 5 | 0 |

The key findings as reported in Table 1 are summarized as follows: (a) without primer, only adhesive failure occurred; (b) Primer 1 (BETASEAL™ 16100A) worked the best, and it improved the adhesion by 50% in the peak load when comparing with the comparative example without primer. (c) Primer 3 (DOWSIL™ 1200 OS) also significantly improved the adhesion with cohesive failure; (d) Two-step primer #2 (BETASEAL™ 43521/43532) showed little effect on the adhesion with adhesive failure. These results confirm the conclusion that the appropriate choice of primer can play an important role in affording cohesive adhesion between silicone adhesive layer and aluminum plate with significant improvement in adhesion strength.

90° Peel Test:

1-inch wide samples were prepared as per ASTM C794-18. The peeling distance was 150 mm (6 inches). The test specimens were placed in an Instron tensile testing machine with the substrate secured to the fixed member and the loose end of the wire mesh screen secured to the movable member at an angle of 90°. The peak load and average load were recorded and the failure mode, either adhesive or cohesive failure, reported. The findings are presented in Table 2.

TABLE 2

| Units | Sample Identification | No Primer (Comparative Example B) | Primer #1 Example 4 | Primer #2 Example 5 | Primer #3 Example 6 |
|---|---|---|---|---|---|
| Peak Load (lbf) | A | 54.91 | 85.87 | 90.12 | 67.89 |
| | B | 52.58 | 82.67 | 89.14 | 62.64 |
| | C | 76.9 | 88.07 | 86.51 | 85.57 |
| | D | 36.55 | 103.07 | 91.43 | 66.01 |
| | E | 96.14 | 90.17 | 70.95 | 60.77 |
| | F | 91.45 | 81.26 | 80.37 | 88.38 |
| | G | 56.78 | 85.14 | 77.41 | 77.14 |
| | H | 76.99 | 93.84 | 77.29 | 64.05 |
| | I | 67.35 | 80.95 | 69.95 | 81.27 |
| | J | | 85.25 | 61.42 | 71.06 |
| | Average | 67.74 | 87.63 | 79.46 | 72.48 |
| | Std. Dev. | 19.45 | 6.74 | 9.99 | 9.96 |
| Average Load (lbf) | A | 34.01 | 64.48 | 77.01 | 47.96 |
| | B | 31.90 | 75.68 | 79.12 | 47.30 |
| | C | 45.64 | 71.58 | 79.54 | 47.63 |
| | D | 22.68 | 88.15 | 53.11 | 55.76 |
| | E | 64.65 | 76.89 | 50.00 | 45.65 |
| | F | 51.63 | 68.44 | 67.49 | 61.49 |
| | G | 40.19 | 77.25 | 62.86 | 49.04 |
| | H | 47.69 | 85.21 | 69.31 | 34.10 |
| | I | 38.39 | 74.51 | 53.95 | 52.10 |
| | J | | 77.08 | 50.16 | 39.57 |
| | Average | 41.86 | 75.93 | 64.26 | 48.06 |
| | Std. Dev. | 12.28 | 7.05 | 11.96 | 7.68 |
| | Number of Adhesive Failures | 0 | 10 | 10 | 0 |
| | Number of Cohesive Failures | 9 | 10 | 10 | 10 |

Similar observations were observed as for the 180° peel test, namely: (a) Comparative Example B without the primer treatment showed the lowest peel strength; (b) Samples treated with Primer #1 (BETASEAL™ 16100A) exhibited the strongest peel strength with an average load of 75.93 lbf, representing more than 80% in the average load improvement relative to Comparative Example B (i.e. an average load of 41.86 lbf); (c) Samples treated with Primer #2 (BETASEAL™ 43521/43532) and Primer #3 (DOWSIL™ 1200 OS) had an average load of 64.26 lbf and 48.06 lbf, respectively; (d) The peak load data displayed larger variation compared to the average load. This further reinforces the conclusion that primers have a positive effective on the adhesion strength between a silicone adhesive layer and an aluminum sheet.

The invention claimed is:

1. A composite panel comprising:
 first and second aluminum sheets each having an inner and outer surface,
 a primer coating based on a silane, a siloxane or a blend of silane and polyurethane on the inner surface of the first and second aluminum sheets and
 an organosilicon adhesive contacting the primer coating on both the first and second metallic sheets, wherein
 the adhesive has a gross heat of combustion (Q-PCS) of no greater than 1.4 MJ/m² and
 the panel is compliant with specification EN 13501-6: 2018, classification A1; and
 wherein the composite panel has the structure, comprising in order,
 i) the first aluminum sheet, ii) the primer coating on the inner surface of the first aluminum sheet,
iii) the organosilicon adhesive,
iv) the primer coating on the inner surface of the aluminum sheet, and
v) the second aluminum sheet.

2. The panel of claim 1 wherein the organosilicon adhesive is polydimethylsiloxane or copolymers thereof.

3. The panel of claim 1 wherein the organosilicon adhesive is a blend of polydimethylsiloxane or copolymers thereof with epoxy or urethane or acrylate.

4. The panel of claim 1 wherein the adhesive has a cure temperature of no greater than 150 degrees C.

5. The panel of claim 1 wherein the thickness of the cured adhesive, when cured, is no greater than 100 micrometers.

6. The panel of claim 1 further comprising a functional layer located on at least one external surface of the aluminum sheets.

7. The panel of claim 4 wherein the adhesive has a cure temperature of no greater than 120 degrees C.

8. The panel of claim 5 wherein the thickness of the adhesive, when cured, is no greater than 70 micrometers.

9. The panel of claim 8 wherein the thickness of the adhesive, when cured, is no greater than 60 micrometers.

* * * * *